US00RE48332E

(19) United States
(12) Reissued Patent
Liu

(10) Patent Number: US RE48,332 E
(45) Date of Reissued Patent: Dec. 1, 2020

(54) VACUUM SEALING CAP

(71) Applicant: FREE-FREE INDUSTRIAL CORP., Taipei (TW)

(72) Inventor: Sheng-Yu Liu, Taipei (TW)

(73) Assignee: FREE-FREE INDUSTRIAL CORP., Taipei (TW)

(21) Appl. No.: 16/553,512

(22) Filed: Aug. 28, 2019

Related U.S. Patent Documents

Reissue of:
(64) Patent No.: 8,186,527
Issued: May 29, 2012
Appl. No.: 12/434,892
Filed: May 4, 2009

(30) Foreign Application Priority Data

Oct. 7, 2008 (TW) ..... 97138576 A

(51) Int. Cl.
*B65D 39/12* (2006.01)
*B65D 53/00* (2006.01)
*B65D 41/00* (2006.01)

(52) U.S. Cl.
CPC ..... *B65D 39/12* (2013.01)

(58) Field of Classification Search
CPC ..... B65D 39/12
USPC ..... 215/317, 320, 341, 354, 359; 220/231, 220/233, 234, 238
See application file for complete search history.

(56) References Cited

U.S. PATENT DOCUMENTS 2,685,380 A * 8/1954 Moeller ..... B65D 39/12 215/359
2,891,694 A * 6/1959 Ackley ..... B65D 39/12 220/238
3,087,641 A 4/1963 Millard
4,083,468 A * 4/1978 Batchelor ..... B65D 39/12 220/234

(Continued)

FOREIGN PATENT DOCUMENTS

FR 808830 A 2/1937
FR 2043878 A 2/1971

(Continued)

OTHER PUBLICATIONS

Official action issued by Korean patent office dated Sep. 20, 2011.

(Continued)

*Primary Examiner* — William C Doerrler

(74) *Attorney, Agent, or Firm* — Chun-Ming Shih; HDLS IPR Services

(57) ABSTRACT

A vacuum sealing cap for a container includes an outer cap body, an inner cap body movable toward or away from the outer cap body, a sealing gasket compressible by the outer cap body to abut sealingly against the mouth of the container when the inner cap body moves toward the outer cap body, a slide member connected to the inner cap body, and an operating member connected pivotally to the slide member and pivotable between first and second positions, where the operating member pulls upwardly and pushes downwardly the slide member to move the inner cap body upwardly toward and downwardly away from the outer cap body. The sealing gasket is pressed and is not pressed sealingly against the mouth of the container in the first and second positions, respectively.

6 Claims, 7 Drawing Sheets

(56) References Cited

U.S. PATENT DOCUMENTS

| | | | | |
|---|---|---|---|---|
| 4,993,246 | A * | 2/1991 | Kopper | B65D 39/12 292/240 |
| 2002/0179562 | A1 | 12/2002 | Sciarini | |
| 2007/0241107 | A1 * | 10/2007 | Matsumoto et al. | B65D 39/12 220/238 |

FOREIGN PATENT DOCUMENTS

| | | | |
|---|---|---|---|
| JP | H08253256 | A | 10/1996 |
| JP | H10245059 | A | 9/1998 |
| TW | 370087 | U | 9/1999 |
| TW | 200640751 | A | 12/2006 |

OTHER PUBLICATIONS

Official action issued by Taiwan Intellectual Property Office dated May 23, 2013.
Official action issued by Canadian Intellectual Property Office dated Mar. 28, 2013.
European Search report dated Nov. 10, 2009.

* cited by examiner

VACUUM SEALING CAP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims priority of Taiwanese Application No. 097138576, filed on Oct. 7, 2008.

BACKGROUND OF THE INVENTION

1. Field of the Invention

This invention relates to a cap, more particularly to a vacuum sealing cap for a container.

2. Description of the Related Art

Generally, a vacuum sealing cap having a sealing gasket is covered on a mouth of a container body, after which one or a plurality of resilient clip fasteners provided on the vacuum sealing cap are fastened to the container body, so that the sealing gasket is disposed tightly between the vacuum sealing cap and the container body, thereby sealing the container body. However, when the vacuum sealing cap with one resilient fastener is used, because of the structure of the resilient clip fastener, it is difficult to pull open the vacuum sealing cap. When the vacuum sealing cap with the plurality of the resilient clip fasteners is used, each of the clip fasteners must be pushed downwardly or pulled upwardly to assemble or remove the vacuum sealing cap to and from the container body, thereby rendering the vacuum sealing cap inconvenient to use.

SUMMARY OF THE INVENTION

Therefore, the object of the present invention is to provide a vacuum sealing cap that is easy and convenient to use.

According to this invention, a vacuum sealing cap for a container comprises an outer cap body adapted to cover removably a mouth of the container and having a top wall, an inner cap body disposed below and movable toward or away from the outer cap body, a sealing gasket that is disposed around an outer periphery of the inner cap body and that is compressible by the outer cap body to abut sealingly against the mouth of the container when the inner cap body moves toward the outer cap body, a slide member movably extending through the outer cap body and connected to the inner cap body, and an operating member connected pivotally to the slide member above the top wall of the outer cap body and pivotable between first and second positions. In the first position, the operating member pulls upwardly the slide member to move the inner cap body upwardly toward the outer cap body so that the sealing gasket is pressed sealingly against the mouth of the container. In the second position, the operating member pushes downwardly the slide member to move the inner cap body downwardly away from the outer cap body so that the sealing gasket is not pressed sealingly against the mouth of the container.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
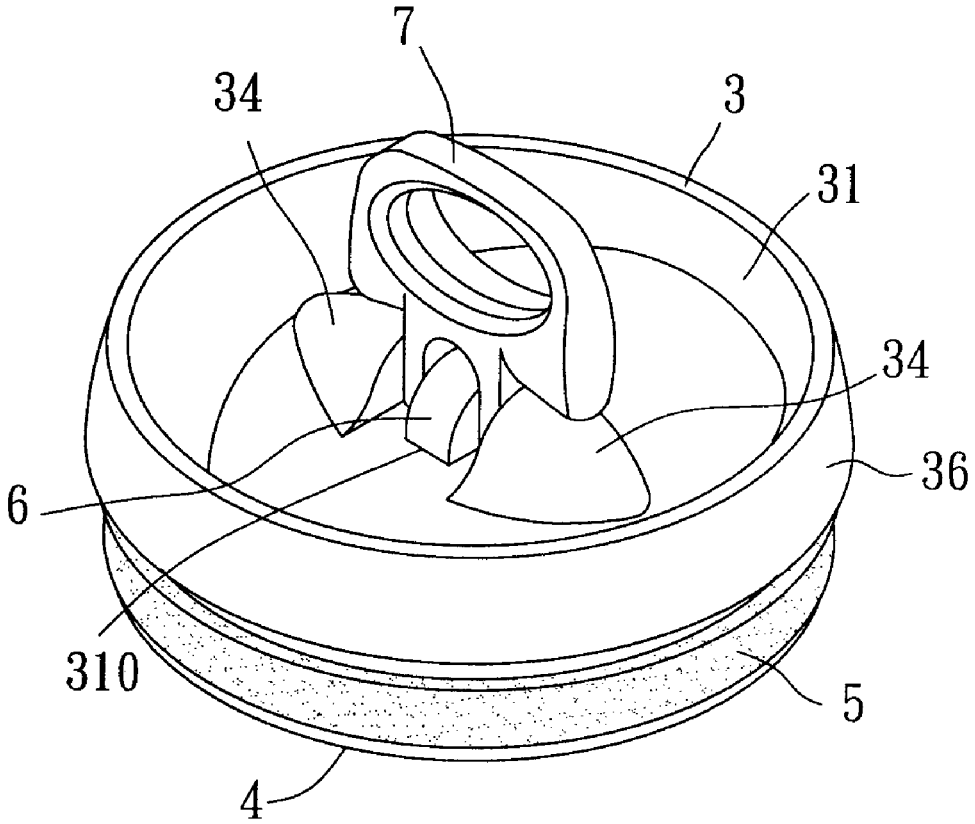
FIG. 1 is a perspective view of a vacuum sealing cap according to the first preferred embodiment of the present invention.
Figure 2:
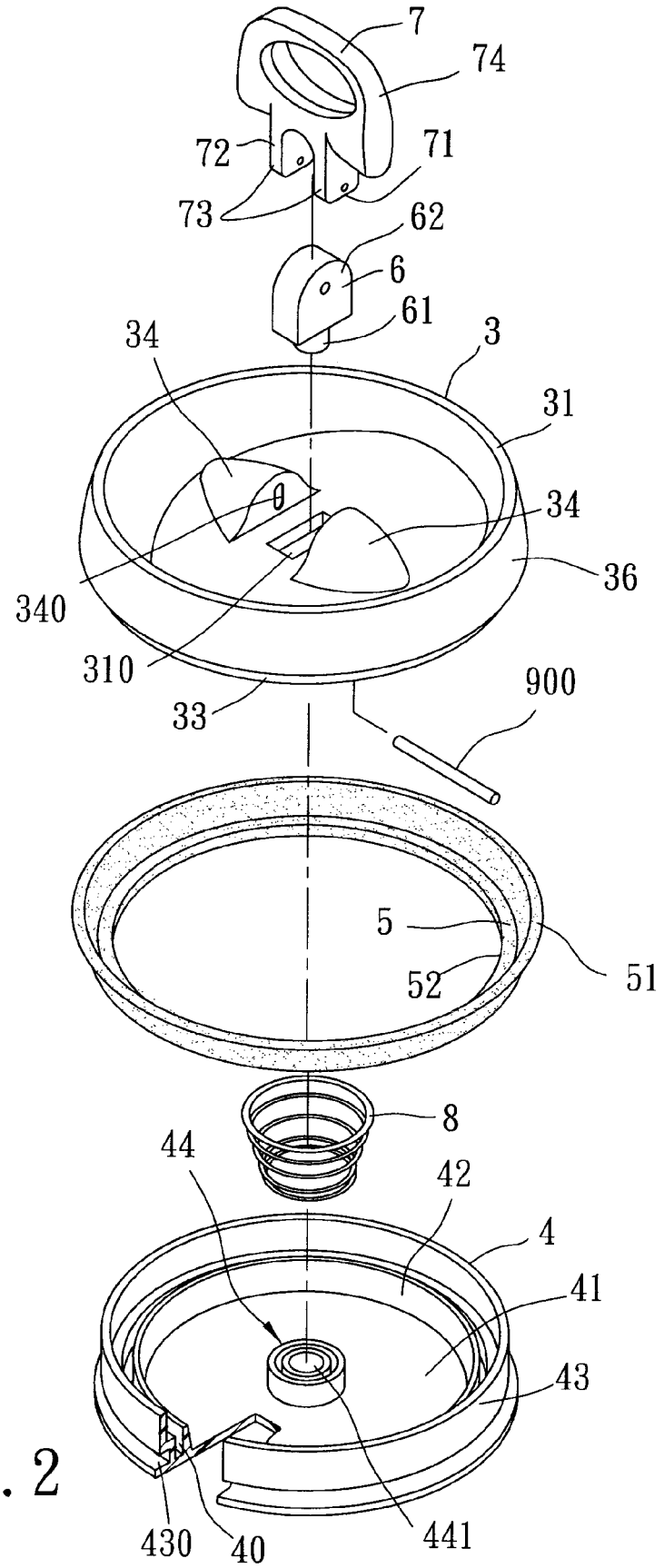
FIG. 2 is an exploded perspective view of the first preferred embodiment.

Before the present invention is described in greater detail, it should be noted that the same reference numerals have been used to denote like elements throughout the specification.

Referring to FIGS. 1 to 4, a vacuum sealing cap according to the first preferred embodiment of the present invention is adapted to cover a mouth of a container 100 so as to seal the container 100, and is shown to comprise an outer cap body 3, an inner cap body 4, an annular sealing gasket 5, a slide member 6, an operating member 7, and a spring element 8.

The outer cap body 3 includes a concaved top wall 31, a skirt portion 36 connected integrally to and extending downwardly from the top wall 31, a first upper limiting member 33 projecting downwardly and annularly from the skirt portion 36, an upper aligning wall 32 projecting downwardly and annularly from the top wall 31 inwardly of the first upper limiting member 33, and two pivot portions 34 fixed oppositely to a top face of the top wall 31. The first upper limiting member 33 is formed with an annular shoulder 331 adapted to abut against a top end of the mouth of the container 100. The top wall 31 is formed with a through hole 310 extending through the top face and a bottom face thereof and disposed between the pivot portions 34. Each of the pivot portions 34 has a slot 340 extending in a top-to-bottom direction and facing the slot 340 of the opposite pivot portion 34. A spindle 900 is connected movably between the slots 340 of the pivot portions 34. In this embodiment, the first upper limiting member 33, the skirt portion 36, the top wall 31, and the upper aligning wall 32 cooperatively define an annular upper receiving groove 30 that opens downwardly.

The inner cap body 4 is disposed below and is movable toward or away from the outer cap body 3, and includes a base wall 41 opposite to the top wall 31, a lower limiting member 43 projecting upwardly and annularly from a top face of the base wall 41, a lower aligning wall 42 projecting upwardly and annularly from the top face of the base wall 41 inwardly of the lower limiting member 43, and a connecting portion 44 projecting upwardly from a central portion of the base wall 41 inwardly of the lower aligning wall 42. In this embodiment, the connecting portion 44 is tubular, and has a central fixing hole 441. The lower limiting member 43 is indented inwardly immediately above the base wall 41 to define an annular groove 430 above the base wall 41. The lower limiting member 43, the lower aligning wall 42, and the base wall 41 cooperatively define an annular lower receiving groove 40 that opens upwardly. The lower limiting member 43 is extendable movably within the upper receiving groove 30 between the upper aligning wall 32 and the first upper limiting member 33, and overlaps and contacts an inner surface of the first upper limiting member 33. The upper aligning wall 32 is extendable movably within the lower receiving groove 40 between the lower aligning wall 42 and the lower limiting member 43. The lower aligning wall 42 overlaps and contacts an inner surface of the upper aligning wall 32. The upper aligning wall 32 and the lower limiting member 43 are disposed between the first upper limiting member 33 and the lower aligning wall 42.

The annular sealing gasket 5 has an annular inner section 52 received in the annular groove 430, and an annular outer section 51 extending upwardly and inclinedly from the inner section 52 externally of the annular groove 430. The outer section 51 is compressible by the first upper limiting member 33 when the inner cap body 4 moves toward the outer cap body 3.

The slide member 6 extends movably through the through hole 310, and has a head portion 62 connected to and movable along with the spindle 900, and a leg portion 61 extending downwardly from the head portion 62 and received fixedly in the fixing hole 441 of the connecting portion 44. Through such a connection, the slide member 6 is movable upwardly and downwardly between the pivot portions 34 and within the through hole 310, and brings therealong the inner cap body 4 so that the inner cap body 4 can move toward or away from the outer cap body 3.

Figure 3:
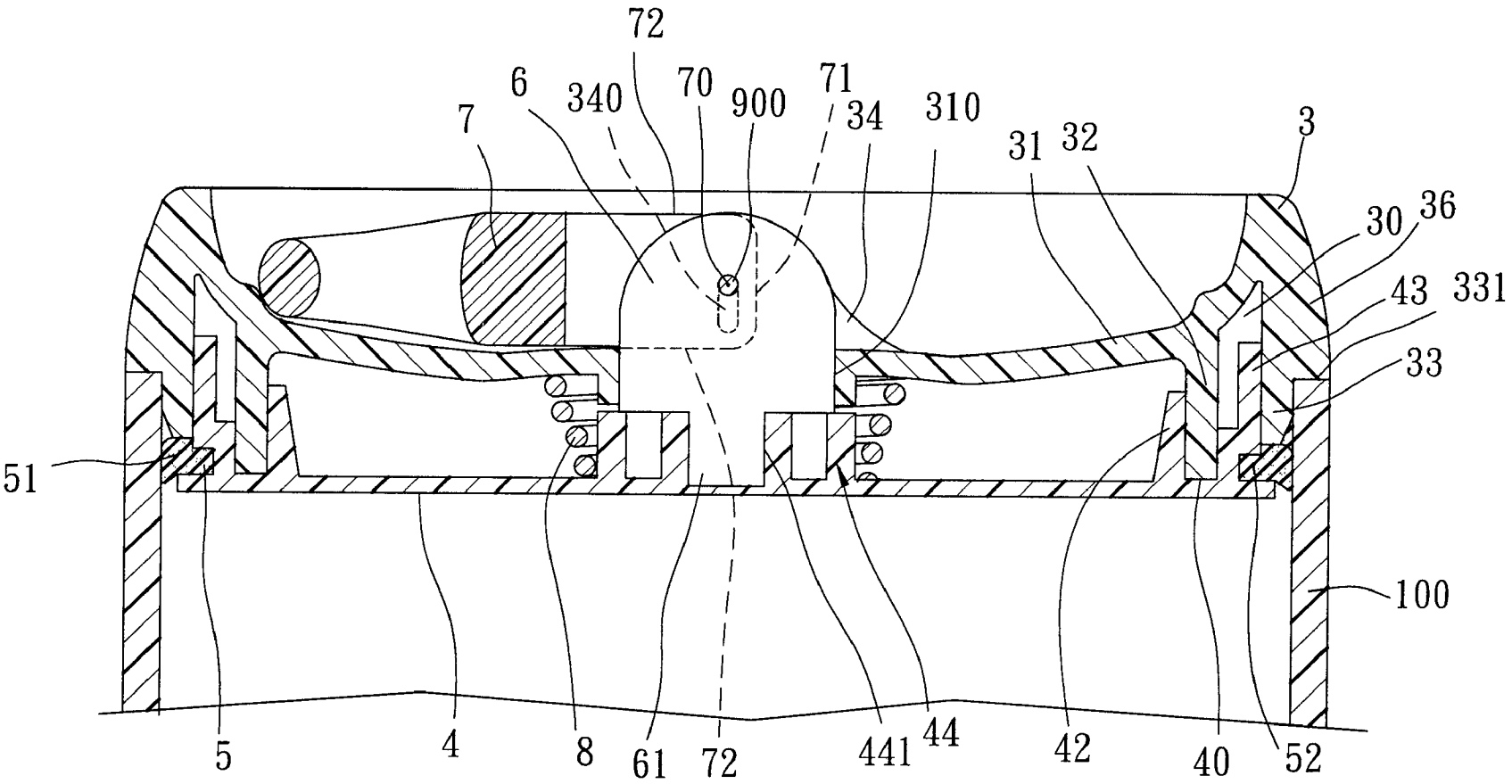
FIG. 3 is a sectional view of the first preferred embodiment, illustrating a sealing gasket of the first preferred embodiment in a sealing position.
Figure 4:
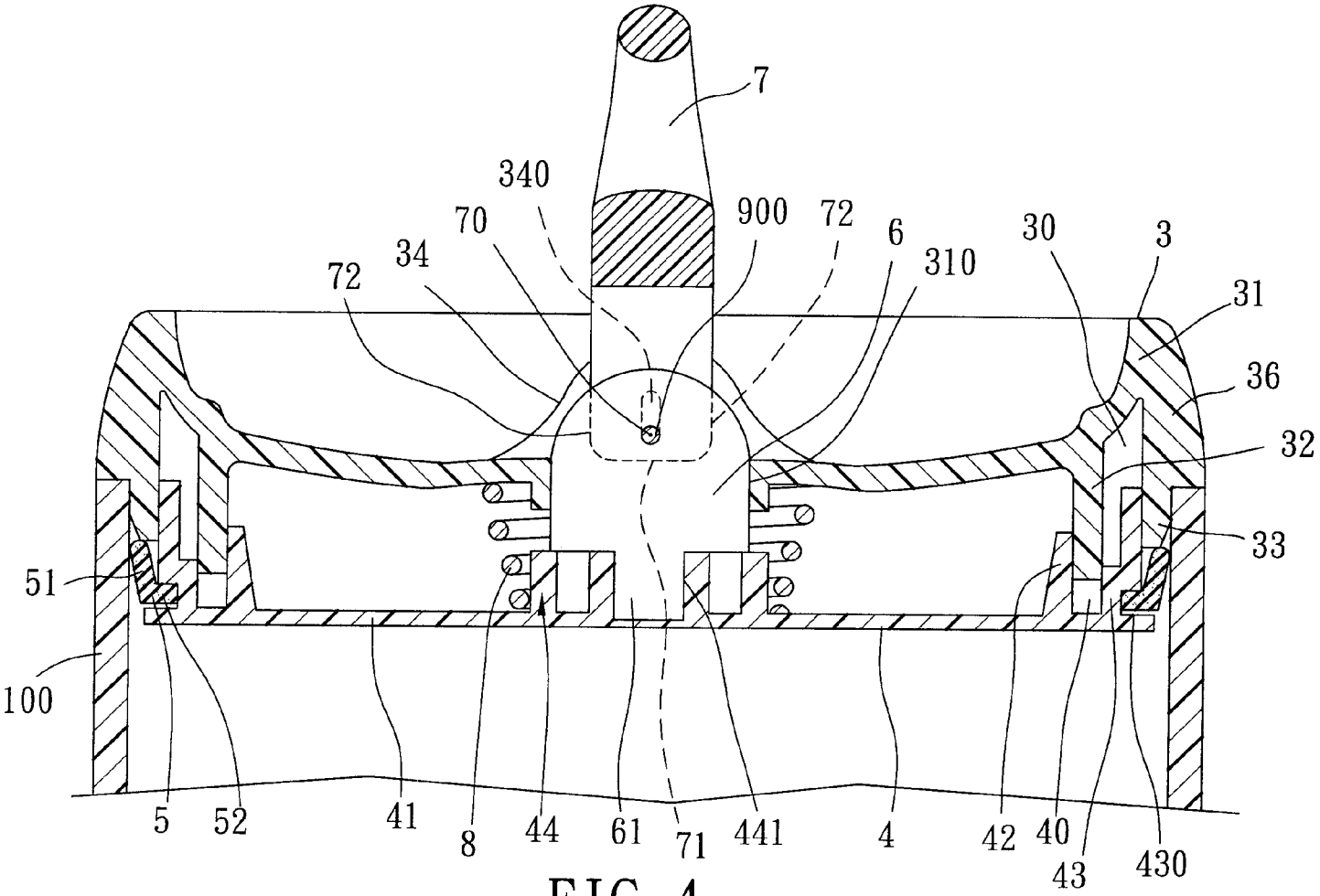
FIG. 4 is a view similar to FIG. 3, but illustrating the sealing gasket of the first preferred embodiment in a non-sealing position.

The operating member 7 has a head portion 74, and two spaced-apart leg portions 73 extending downwardly from the head portion 74 and connected pivotally to the spindle 900 on two opposite sides of the head portion 62. Each leg portion 73 has a bottom end face 71, and two opposite side faces 72 transverse to the bottom end face 71. The bottom end face 71 of each leg portion 73 is spaced apart from a pivot point 70 of the operating member 7 at a distance smaller than a distance from the pivot point 70 to either one of the side faces 72. The operating member 7 is pivotable leftward and rightward relative to the top wall 31 of the outer cap body 3, and is pivotable between first and second positions. In the first position, as shown in FIG. 3, the operating member 7 pulls upwardly the slide member 6 so as to move the inner cap body 4 upwardly toward the outer cap body 3 so that the sealing gasket 5 is pressed sealingly against the mouth of the container 100. At this time, one of the side faces 72 of each leg portion 73 abuts against the top face of the top wall 31, and the spindle 900 abuts against top ends of the slots 340 of the pivot portions 34. In the second position, as shown in FIG. 4, the operating member 7 pushes downwardly the slide member 6 so as to move the inner cap body 4 downwardly away from the outer cap body 3 so that the sealing gasket 5 is not pressed sealingly against the mouth of the container 100. At this time, the bottom end face 71 of each leg portion 73 faces and abuts against the top face of the top wall 31, and the spindle 900 abuts against bottom ends of the slots 340 of the pivot portions 34.

The spring element 8 is disposed between the top wall 31 and the base wall 41 for biasing the inner cap body 4 downwardly away from the outer cap body 3 when the operating member 7 is in the second position, and has one end abutting against the bottom face of the top wall 31, and another end sleeved around an outer periphery of the connecting portion 44 and abutting against the top face of the base wall 41.

To seal the container 100, the operating member 7 is first moved to the second position, as shown in FIG. 4, after which the outer cap body 3 is pressed downwardly to close the mouth of the container 100. At this time, the annular shoulder 331 abuts against a top end of the mouth of the container 100, the first upper limiting member 33 abuts against an inner face of the mouth of the container 100, the inner cap body 4 is disposed within the container 100, and the outer section 51 of the sealing gasket 5 abuts against the inner face of the mouth of the container 100 below the first upper limiting member 33. Subsequently, the operating member 7 is pivoted to the first position, as shown in FIG. 3, so that one of the side faces 72 of each leg portion 73 abuts against the top face of the top wall 31. Because each side face 72 of each leg portion 73 of the operating member 7 is spaced apart from the pivot point 70 at a distance larger than that from the bottom end face 71 of each leg portion 72 to the pivot point 70, the operating member 7 can pull the slide member 6 to slide upwardly along the through hole 310. The slide member 6, in turn, pulls the inner cap body 4 therealong, so that the inner cap body 4 moves upwardly toward the outer cap body 3. At this time, the outer section 51 of the sealing gasket 5 is compressed by the first upper limiting member 33 so as to deform resiliently, outwardly, and downwardly to abut sealingly against the inner face of the mouth of the container 100, thereby sealing the container 100. The vacuum sealing cap of the present invention is not easily detached from the container 100 in this state. The spring element 8 is compressed between the top wall 31 and the base wall 41 to store a restoring force at this time.

To open the container 100, the operating member 7 is simply pivoted upwardly so as to be disposed in the second position, as shown in FIG. 4, and through the restoring force of the spring element 8, the inner cap body 4 is biased by the spring element 8 to move downwardly away from the outer cap body 3. The inner cap body 4, in turn, pulls the slide member 6 to slide downwardly along the through hole 310. The slide member 6 pulls therealong the bottom end faces 71 of the leg portions 73 of the operating member 7 until the bottom end faces 71 of the leg portions 73 abut against the top face of the top wall 31. The outer section 51 of the sealing gasket 5 is released from being pressed sealingly against the inner face of the mouth of the container 100 by the first upper limiting member 33, and is restored to an initial position shown in FIG. 4. The vacuum sealing cap of the present invention can be easily pulled upwardly and away from the mouth of the container 100 in this state.

The structures of the first upper limiting member 33 and the lower limiting member 43 in this embodiment are so designed to facilitate stable movement of the inner cap body 4 toward and away from the outer cap body 3. The presence of the spring element 8 facilitates quick movement of the inner cap body 4 downwardly away from the outer cap body 3. In an alternative embodiment, the outer cap body 3 is not necessarily provided with the first upper limiting member 33, and the inner cap body 4 is not necessarily provided with the lower limiting member 43. Further, the spring element 8 may be dispensed herewith.

Figure 5:
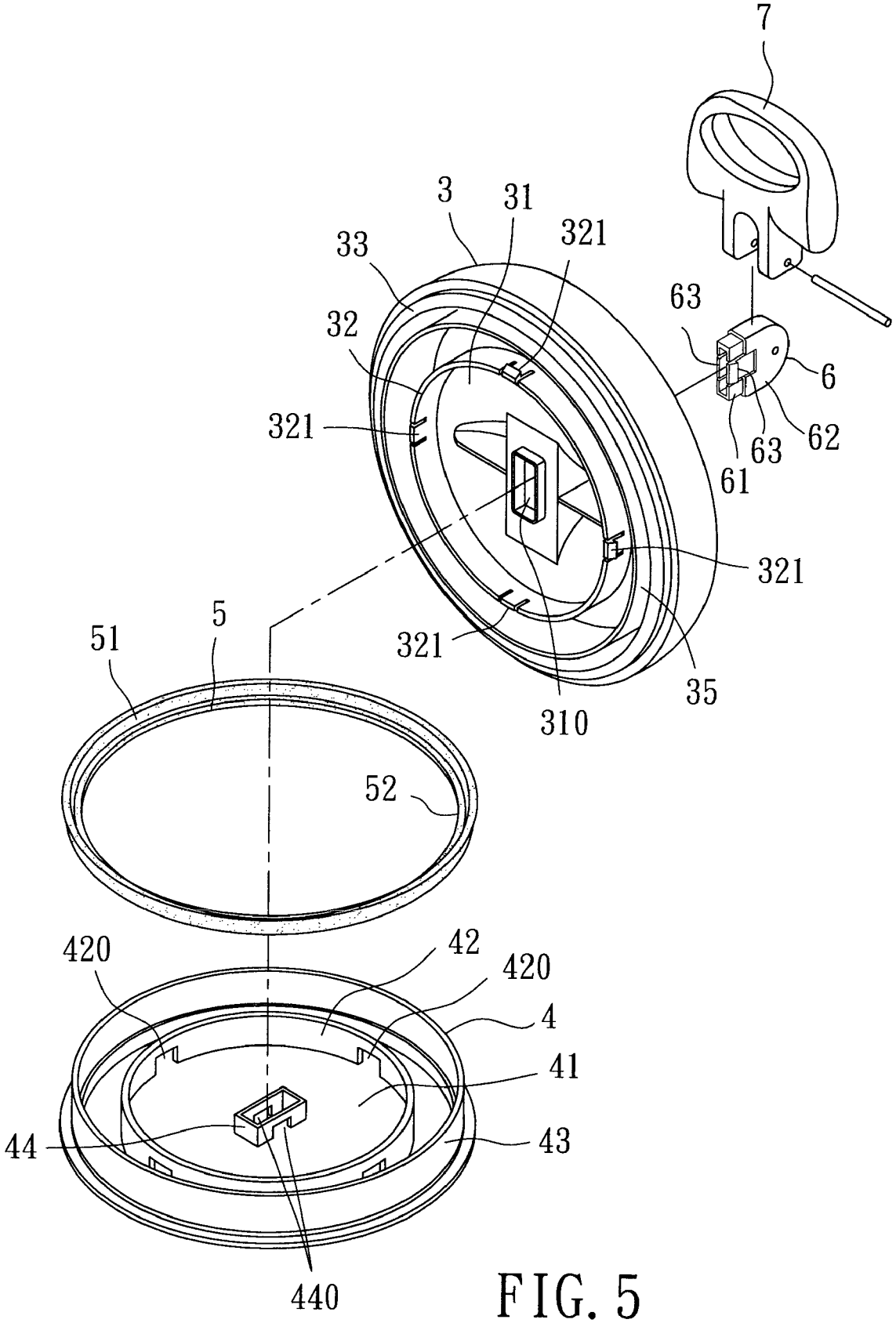
FIG. 5 is an exploded perspective view of a vacuum sealing cap according to the second preferred embodiment of the present invention.
Figure 6:
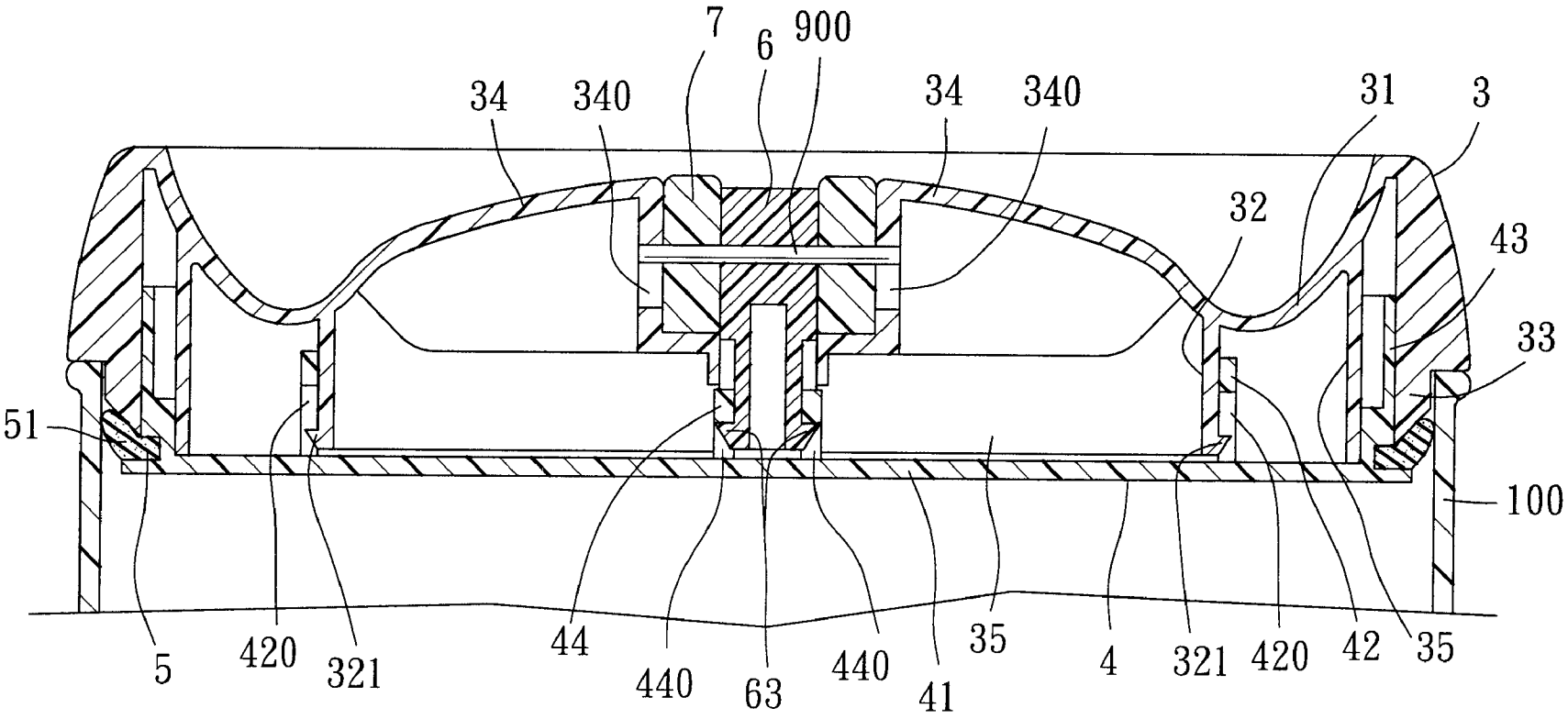
FIG. 6 is a sectional view of the second preferred embodiment in an assembled state, illustrating a sealing gasket of the second preferred embodiment in a sealing position.
Figure 7:
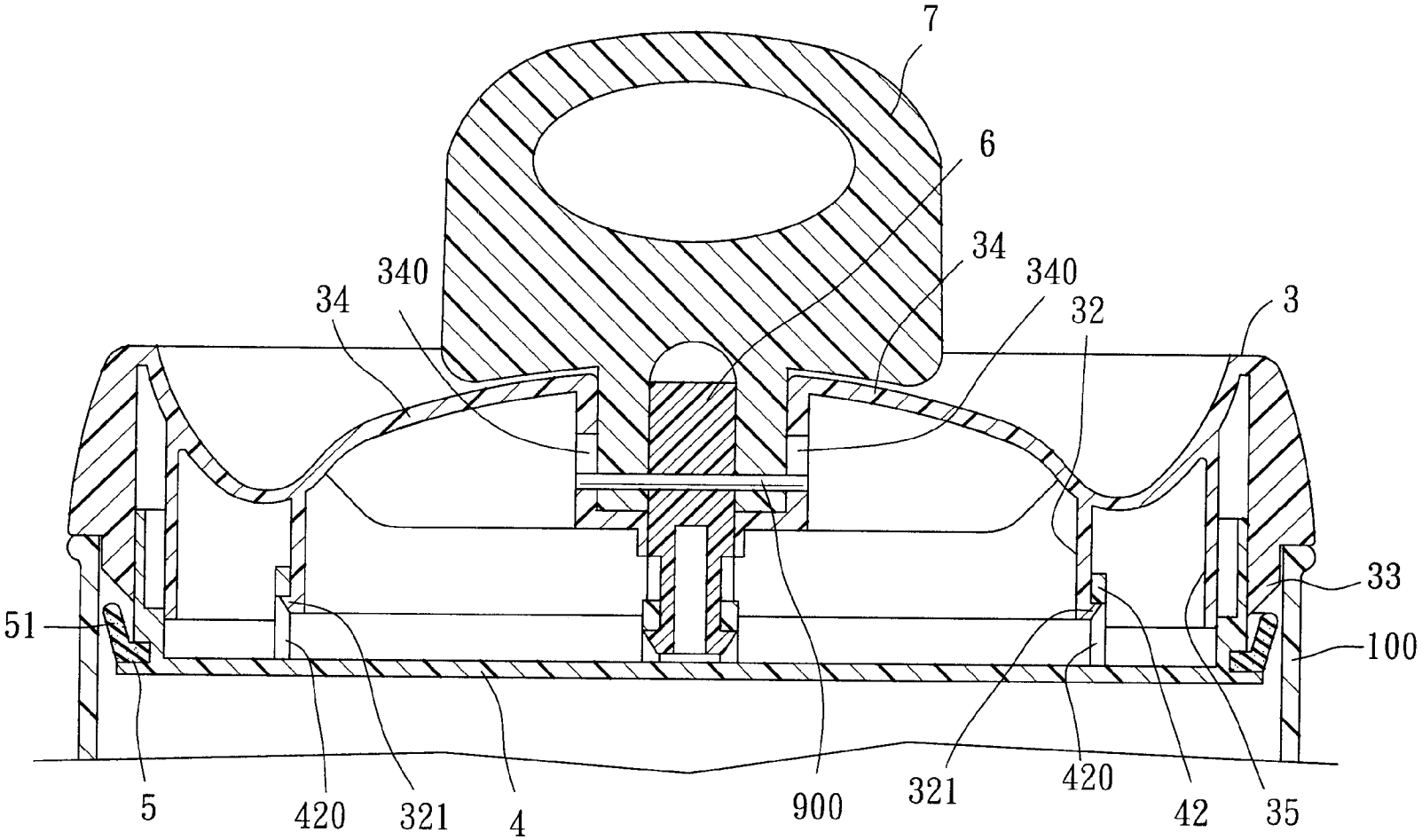
FIG. 7 is a view similar to FIG. 3, but illustrating the sealing gasket of the second preferred embodiment in a non-sealing position.

Referring to FIGS. 5 to 7, a vacuum sealing cap according to the second preferred embodiment of the present invention is shown to be similar to the first preferred embodiment. However, in this embodiment, the spring element 8 (see FIG. 2) is dispensed herewith, and the outer cap body 3 further includes a second upper limiting member 35 projecting downwardly and annularly from the top wall 31 between the first upper limiting member 33 and the upper aligning wall 32, and four angularly spaced-apart hook members 321 projecting outwardly from an outer surface of the upper aligning wall 32. The connecting portion 44 of the inner cap body 4 is a hollow rectangular portion having two opposite longer sides each provided with an engaging hole 440. The lower limiting member 42 overlaps and contacts the outer surface of the upper aligning wall 32, and is provided with four angularly spaced-apart guide holes 420. The hook members 321 extend respectively into the guide holes 420, and are movable upwardly and downwardly within the respective guide holes 420.

The leg portion 61 of the slide member 6, in this embodiment, is rectangular, and has two opposite hook members 63 projecting outwardly and respectively from two opposite longer sides of the leg portion 61 and engaged respectively and fixedly to the engaging holes 440 in the longer sides of the connecting portion 44.

Use of the vacuum sealing cap according to the second preferred embodiment of the present invention is similar to that described in the first preferred embodiment. Particularly, when the operating member 7 is pivoted to the first position, as shown in FIG. 6, and pulls the slide member 6 to slide upwardly along the through hole 310, the slide member 6, in turn, pulls the inner cap body 4 therealong, so that the inner cap body 4 moves upwardly toward the outer cap body 3. At this time, the outer section 51 of the sealing gasket 5 is compressed by the first upper limiting member 33 so as to deform resiliently, outwardly, and downwardly to abut sealingly against the inner face of the mouth of the container 100, thereby sealing the container 100. To open the container 100, aside from pivoting the operating member 7 to the second position, as shown in FIG. 7, the operating member 7 must be pushed downwardly also so as to force the slide member 6 to push the inner cap body 4 downwardly and away from the outer cap body 3, thereby permitting release of the sealing gasket 5 from being pressed sealingly against the inner face of the mouth of the container 100 by the first upper limiting member 33.

In this embodiment, the lower aligning wall 42 overlaps and contacts the outer surface of the upper aligning wall 32, and the hook members 321 are movable within the respective guide holes 420, so that movement of the inner cap body 4 toward and away from the outer cap body 3 can be more stable. In an alternative embodiment, the lower aligning wall 42 may overlap and contact the inner surface of the upper aligning wall 32. Further, the outer cap body 3 is not necessarily provided with the upper aligning wall 32, and the inner cap body 4 is not necessarily provided with the lower aligning wall 42. From the aforementioned description, it is apparent that through the interconnection of the operating member 7 and the slide member 6, the inner cap body 4 can move toward and away from the outer cap body 3, so that the outer section 51 of the sealing gasket 5 can be pressed sealingly against and released from the inner face of the mouth of the container 100 so as to seal and unseal the mouth of the container 100. Further, by simply pivoting the operating member 7 between the first and second positions, the mouth of the container 100 can be sealed and unsealed by the vacuum sealing cap of the present invention. Hence, use of the vacuum sealing cap of the present invention is easy and convenient.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A vacuum sealing cap for a container, comprising:

an outer cap body adapted to cover removably a mouth of the container and having a top wall, *wherein said outer cap body further includes a skirt portion extending downwardly from said top wall and a first upper limiting member projecting downwardly and annularly from said skirt portion*;

an inner cap body disposed below and movable toward or away from said outer cap body *and having a base wall opposite to said top wall of said outer cap body*;

a sealing gasket that is disposed around an outer periphery of said inner cap body and that is compressible by said outer cap body to abut sealingly against the mouth of the container when said inner cap body moves toward said outer cap body;

a slide member movably extending through said outer cap body and connected to said inner cap body; and an operating member connected pivotally to said slide member above said top wall of said outer cap body, and being pivotable between a first position, where said operating member pulls upwardly said slide member to move said inner cap body upwardly toward said outer cap body so that said sealing gasket is pressed sealingly against the mouth of the container, and a second position, where *a spring element is disposed between the top wall and the base wall, and* said operating member [pushes downwardly] *causes* said slide member *to be pushed downwardly and via the spring element* to move said inner cap body away from said outer cap body so that said sealing gasket is not pressed sealingly against the mouth of the container wherein said operating member has a transverse bottom end face and two opposite longitudinal side faces, said bottom end face being spaced apart from a pivot point of said operating member at a distance smaller than a distance from said pivot point to either one of said side faces, said bottom end face facing said top wall of said outer cap body when said operating member is in said second position, one of said side faces abutting against said top wall of said outer cap body when said operating member is in said first position; and wherein said [inner cap body has a] base wall [opposite to said top wall of said outer cap body and] *is* connected to said slide member, and *said inner cap body has* a lower limiting member extending upwardly and annularly from said base wall and indented inwardly immediately above said base wall to define an annular groove above said base wall, said sealing gasket having an inner section received in said annular groove, and an outer section extending upwardly and inclinedly from said inner section and compressible by said outer cap body to move downwardly and outwardly when said inner cap body moves toward said outer cap body.

2. The vacuum sealing cap of claim 1, wherein [said outer cap body further includes a skirt portion extending downwardly from said top wall, and a first upper limiting member projecting downwardly and annularly from said skirt portion,] said lower limiting member overlapping and contacting an inner surface of said first upper limiting member, said sealing gasket being compressible by said first upper limiting member when said inner cap body moves toward said outer cap body.

3. The vacuum sealing cap of claim 2, wherein said outer cap body further includes an upper aligning wall projecting downwardly and annularly from said top wall inwardly of said first upper limiting member, said lower limiting member being disposed between said upper aligning wall and said first upper limiting member.

4. The vacuum sealing cap of claim 3, wherein said inner cap body further includes a lower aligning wall projecting upwardly and annularly from said base wall inwardly of said lower limiting member, said lower aligning wall overlapping and contacting said upper aligning wall.

5. The vacuum sealing cap of claim 4, wherein said inner cap body further includes a connecting portion projecting upwardly from a central portion of said base wall, said slide member being connected fixedly to said connecting portion.

[6. The vacuum sealing cap of claim 5, further comprising a spring element disposed between said top wall and said base wall for biasing said inner cap body downwardly away from said outer cap body.]

7. [The vacuum sealing cap of claim 5.] *A vacuum sealing cap for a container, comprising:*

*an outer cap body adapted to cover removably a mouth of the container and having a top wall;*

*an inner cap body disposed below and movable toward or away from said outer cap body;*

*a sealing gasket that is disposed around an outer periphery of said inner cap body and that is compressible by said outer cap body to abut sealingly against the mouth of the container when said inner cap body moves toward said outer cap body;*

*a slide member movably extending through said outer cap body and connected to said inner cap body; and*

*an operating member connected pivotally to said slide member above said top wall of said outer cap body, and being pivotable between a first position, where said operating member pulls upwardly said slide member to move said inner cap body upwardly toward said outer cap body so that said sealing gasket is pressed sealingly against the mouth of the container, and a second position, where said operating member pushes downwardly said slide member to move said inner cap body away from said outer cap body so that said sealing gasket is not pressed sealingly against the mouth of the container,*

*wherein said operating member has a transverse bottom end face and two opposite longitudinal side faces, said bottom end face being spaced apart from a pivot point of said operating member at a distance smaller than a distance from said pivot point to either one of said side faces, said bottom end face facing said top wall of said outer cap body when said operating member is in said second position, one of said side faces abutting against said top wall of said outer cap body when said operating member is in said first position;*

*wherein said inner cap body has a base wall opposite to said top wall of said outer cap body and connected to said slide member, and a lower limiting member extending upwardly and annularly from said base wall and indented inwardly immediately above said base wall to define an annular groove above said base wall, said sealing gasket having an inner section received in said annular groove, and an outer section extending upwardly and inclinedly from said inner section and compressible by said outer cap body to move downwardly and outwardly when said inner cap body moves toward said outer cap body;*

*wherein said outer cap body further includes a skirt portion extending downwardly from said top wall, and a first upper limiting member projecting downwardly and annularly from said skirt portion, said lower limiting member overlapping and contacting an inner surface of said first upper limiting member, said sealing gasket being compressible by said first upper limiting member when said inner cap body moves toward said outer cap body;*

*wherein said outer cap body further includes an upper aligning wall projecting downwardly and annularly from said top wall inwardly of said first upper limiting member, said lower limiting member being disposed between said upper aligning wall and said first upper limiting member;*

*wherein said inner cap body further includes a lower aligning wall projecting upwardly and annularly from said base wall inwardly of said lower limiting member, said lower aligning wall overlapping and contacting said upper aligning wall;*

*wherein said inner cap body further includes a connecting portion projecting upwardly from a central portion of said base wall, said slide member being connected fixedly to said connecting portion;* wherein said outer cap body further includes a second upper limiting member projecting downwardly and annularly from said top wall between said first upper limiting member and said upper aligning wall, and a plurality of angularly spaced-apart hook members provided on said upper aligning wall, said lower aligning wall being provided with a plurality of angularly spaced-apart guide holes, said hook members extending respectively into said guide holes and being movable upwardly and downwardly within said guide holes, respectively.

* * * * *